United States Patent Office 3,687,784
Patented Aug. 29, 1972

3,687,784
APPARATUS FOR PREPARING A MULTI-LAYER STRUCTURE
Yoshio Ohno, Korekiyo Eda, and Toshio Tamamura, Tokyo, and Kosaburo Yamasaki, Ichikawa-shi, Chiba-ken, Japan, assignors to Kanegafuchi Boseki Kabushiki Kaisha, Tokyo, Japan
Filed May 11, 1970, Ser. No. 36,216
Claims priority, application Japan, May 15, 1969, 44/37,013, 44/44,194
Int. Cl. B29b 5/04
U.S. Cl. 156—500
16 Claims

ABSTRACT OF THE DISCLOSURE

An easily separable uniform multi-layer structure, as a pre-final product, made of a material such as synthetic resin is prepared continuously and economically by constantly dispensing streams of viscous liquid from above into a continuous series of open top, flat-bottomed receptacles as they move in one direction at a constant speed on the horizontal surface of at least one straight section of an endless looped conveyor means to first form a uniform layer of said liquid on the entire floor surface of each receptacle, thereafter depositing a partition sheet material such as paper which is non-adhesive to said viscous liquid onto the upper surface of each of said layers of liquid, and repeating the foregoing steps as said receptacles are continuously carried forward on said looped conveyor. Said multi-layer structure can be easily separated into a plurality of independent layers by subsequently removing the non-adhesive partition sheets from the formed initial multi-layer structure after the remaining components of the latter are solidified and united together within themselves by a treatment such as heat-setting.

BACKGROUND OF THE INVENTION

(a) Field of the invention

The present invention is concerned with a method and an apparatus for the continuous and economical production of uniform multi-layer structures, as pre-final products, which are later finished—on a mass production scale—into generally rectangular sheets or plates or like articles each having a given thickness and being made with a material such as synthetic resin, foamed synthetic resin, a man-made leather, synthetic rubber, sheet-form packings and gaskets, mortar, asphalt, agar-agar and jelly, and more particularly, it relates to a method and apparatus for the continuous and economical preparation of an easily separable, uniform multi-layer structure which is a pre-final product—suitable for mass production of the above-listed final articles especially of the type having, sandwiched therein, a sheet material such as cloth or paper serving as a reinforcement and/or ornamental means—consisting of a plurality of superposed assemblies each being formed with two adjacent layers of a viscous liquid and a sheet material serving as a partition sheet made with a sheet-form natural or man-made material and sandwiched between said two adjacent layers of liquid.

(b) Description of the prior art

Of late, synthetic resins have undergone marked improvement and they are now being utilized in various fields of industries and in daily life in place of various known materials. With the recent advancement of the technique of foaming synthetic resins, there have been developed and placed on the market a variety of foamed articles made with synthetic resins. There are many ways in which synthetic resins are used. Very often, they are provided and used in the form of either sheets or plates or boards of given thicknesses, regardless of whether they are provided as final products or pre-final products. Depending on the use, however, these final as well as pre-final products may each be provided with a sheet material selected from a number of different materials and sandwiched between two adjacent layers or webs of synthetic resin to serve as a reinforcement and/or ornamental means. This arrangement applies in the same way to foamed articles also. It is also very often required to perform mass production of foamed or other type of sheet- or plate-form resinous structures of a given thickness and configuration which is usually rectangular, or to manufacture, in large quantities, similar structures each containing a reinforcement sheet material between each two adjacent webs of such synthetic resin.

As a method for obtaining a foamed or sheet-like product, there is the known process comprising the steps of first producing a uniform flat layer of viscous liquid of a synthetic resin by pouring a continuous ribbon of such a liquid onto the floor of an open top, flat-bottomed supporting means, starting at one end of said floor and ending at the other end thereof, and then subjecting the resulting uniform layer of liquid to a heat-setting treatment.

Also known is the method for manufacturing an article having a reinforcement sheet material sandwiched between the webs of a resinous or other material as enumerated above, said method comprising the steps of: first forming a uniform layer of viscous liquid having a flat liquid surface in the manner described above; depositing a reinforcement sheet material made of a sheet of fabric or the like directly onto the surface of said layer of liquid so as to cover the entire surface thereof; thereafter forming another similar layer of liquid on top of said reinforcement sheet material so as to cover the entire surface of the latter sheet material; and then depositing a film-like partition material, such as fibrous paper or a fabric, which is hardly adhesive to said viscous liquid onto the entire surface of said layer of viscous liquid, while repeating the foregoing sequential series of steps to produce a multilayer structure containing layers of viscous liquid of synthetic resin, partition sheet materials, with or without reinforcement sheet materials, said multi-layer structure being arranged so that each two adjacent layers of viscous liquid contain one partition sheet material sandwiched there-between to form one unit or assembly and this assembly is superposed one upon another with the partition sheet material being interposed between each two adjacent assemblies. The resulting entire laminar structure is then subjected to a heat-setting treatment and thereafter the partition sheet materials are removed from the assemblies to thereby obtain separate assemblies or final product of either sheet or plate form, with or without a reinforcement sheet material sandwiched between each two adjacent webs of heat-set synthetic resin. This latter method is superior to the first-mentioned process which is intended for producing a structure having only one layer of a synthetic resin or having only one layer of this resin superposed on a single layer or sheet of reinforcement material, since said latter method permits one to obtain in large quantities at the same time a structure containing a multiple number of continuous but easily separable assemblies superposed one upon another which are of substantially the same thickness and configuration so that they are suitable for subsequent use in mass production of final articles utilizing these assemblies. Both of these known processes and methods, however, have so far resorted to manual operations, and accordingly, they were very far from being satisfactory from the viewpoint of production on a large scale and also from the aspect of continuous automatised production.

We had undertaken for many years a research on the method of manufacturing a sheet structure or a plate structure utilizing a porous polyvinyl acetal material and also of manufacturing a structure using the same material but containing a sheet material such as a fabric which is sandwiched therein. Recently, however, we discovered a method for forming a uniform multi-layer structure as a pre-final product consisting of laminations of layers of a viscous liquid and natural or man-made sheet materials from an industrial viewpoint of achieving mass production, and concentrated our energy and efforts on the study of this subject. As a result, we have succeeded at length in obtaining a continuous and automatised method of preparing said pre-final product, and thus, the present invention has been worked out.

SUMMARY OF THE INVENTION

It is, therefore, a primary object of the invention to provide a method and an apparatus for continuously preparing an easily separable multi-layer structure consisting of layers of a viscous liquid and natural or man-made sheet materials which are arranged in the manner as described.

Another object of the present invention is to provide a method and an apparatus which permits continuous operation of forming a uniform multi-layer structure and which permits automatised performance of at least the principal steps of said operation by the arrangement that a viscous liquid is adapted to be supplied at a constant rate onto the floor of an open top, flat-bottomed receptacle to form a flat layer of viscous liquid in the receptacle and that a sheet material, either natural or man-made, is adapted to be deposited on the enitre surface of the resulting layer of said viscous liquid, in such a manner that the supply of the viscous liquid and the supply of the sheet material are performed repeatedly in alternate fashion.

Still another object of the present inventon is to provide a method and an apparatus for continuously preparing a uniform multi-layer structure as a pre-final product consisting of layers of a viscous liquid and natural or man-made sheet materials, which are suitable for use in mass production of generally rectangular sheet- or plate-form final articles of a given thickness made of a material such as synthetic resin, foamed synthetic resin, man-made leather, synthetic rubber, sheet-form packings and gaskets, mortar, asphalt, agar-agar and jelly, and especially those articles made of some of the materials mentioned above but each containing a sheet material such as a fabric which is sandwiched therein.

Yet another object of the present invention is to provide a method and an apparatus for continuously preparing a uniform multi-layer structure as a pre-final product consisting of layers of a viscous liquid and natural or man-made sheet materials, which are suitable for use in mass production of sheet- or plate-form final articles consisting of porous polyvinyl acetal materials, and especially those articles made of the same materials but each containing a sheet material such as a fabric which is sandwiched therein.

DETAILED DESCRIPTION OF THE PREFERRED EMBODIMENT

Figure 1:
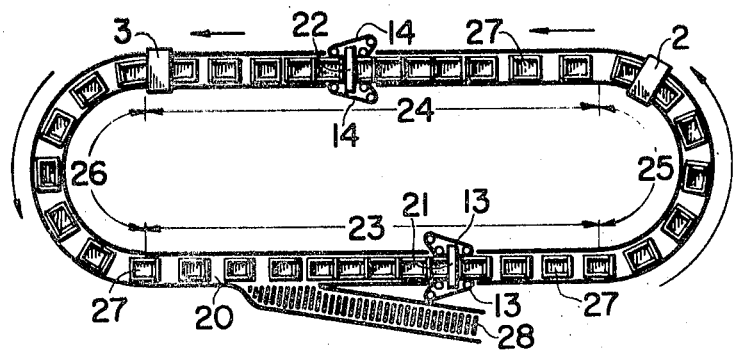
FIG. 1 is a somewhat diagrammatic plan view, showing an example of the apparatus for use in putting the method of the present invention into practice.

It should be understood that the uniform multi-layer structure which is prepared according to the present invention and which consists of layers of a viscous liquid and natural or man-made sheet materials may be termed as a pre-final product which is formed during the initial process of manufacture of the desired finished articles. It is, therefore, necessary that this multi-layer structure be subjected to a subsequent further process such as heating in order to obtain the desired finished articles. It is only with such subsequent further processes that the desired finished articles are obtained.

In order to continuously and automatically prepare uniform multi-layer structures consisting of layers of a viscous liquid and natural or man-made sheet materials, it has been mandatory to solve the following problems:

(1) The viscous liquid which is supplied as it is delivered from a viscous liquid dispensing means is required to spread rapidly to form a layer of a uniform thickness and a smooth flat surface extending over the entire area of either the floor or the supporting surface within a receptacle.

(2) As the viscous liquid is supplied continuously as it flows downwardly from a fixed viscous liquid dispensing means into receptacles, the liquid must not be spilled outside the borders or edges of the receptacles to avoid the resulting loss of the liquid and the soiling of the apparatus thereby.

(3) In order to perform circulatory transfer of the receptacles, the endless conveyor means must have curved or looped sections, and each receptacle is required to effect smooth passage through such curved or looped sections.

It is needless to say, from mainly the aspect of equipment cost industrially, that the viscous liquid dispensing means preferably is fixed and that the viscous liquid preferably is dispensed continuously at a constant rate.

As a solution of the problem (1) enumerated above, it is necessary for the receptacles to proceed at a constant speed when they are to receive the supply of the viscous liquid from the dispensing means. Also, it is desirable that the viscous liquid be caused to flow downwardly in a uniform fashion in a direction perpendicular to the direction of the travel of the receptacles and that the liquid be thus supplied into the receptacle for the entire transverse inner breadth of each receptacle. It is also desirable that each receptacle be provided with two side walls and two end walls. These four side and end walls may be constructed substantially perpendicular with respect to the bottom plane of the receptacle. However, it is desirable that the end wall located on the forward side or the leading side, facing the direction of travel of the receptacle, be inclined outwardly as it extends from bottom to top. This inclination of this end wall on the forward side of the receptacle is necessary for the reasons that, if the viscous liquid is dispensed so that it flows straight downwardly onto a receptacle whose two end walls are both upright without any inclination, the viscous liquid will fail to drop onto the extreme forward end portion of the floor area of the receptacle owing to the relative movement of the continuous down-flowing streams of liquid and the receptacle travelling in a horizontal direction, and that thus there will be formed a so-called "dead angle" or "shade" in that particular region of the floor of the receptacle. This problem is now solved by the provision of the forward end wall which is inclined upwardly and outwardly as it extends from bottom to top. In case the viscous liquid is of a relatively high viscosity, and in case both of these end walls of the receptacle consist of upright walls without the provision of a single inclined end wall, it will be understood that either there will always be formed no layer of viscous liquid in the particular area entertained by the dead angle or there will be always formed a very thin layer of such a liquid, and thus, it will become difficult to satisfy the purpose of acquiring a layer of viscous liquid having a uniform thickness throughout this layer. It should be understood also that the provision of a single inclined end wall only on the forward side of the receptacle facing the direction of its travel is sufficient. Though it depends on the speed at which the receptacle is transferred, it will be sufficient for each receptacle to have this forward end wall inclined at an angle of 5 to 8° with respect to the vertical or perpendicular plane in case the speed of travel of the receptacle is 5 meters per minute. Ideally speaking, if the rear or trailing end wall located opposite to the aforesaid forward end wall, that is, opposite to the direction of travel, is also inclined toward the inside of the receptacle as the wall extends from top to bottom, then there will be obtained a layer of viscous liquid having an even more uniform thickness. As a result of the experiment undertaken by the inventors, however, it has been found that the inclination of the rear end wall may be omitted without being accompanied by any practical harm.

To solve the problem (2), it is necessary that no spacing be present between the two adjacent transverse top end edges of the rear end wall of the preceding receptacle and the forward end wall of the following receptacle during the period in which these two travelling receptacles receive the supply of the viscous liquid under the viscous liquid dispensing means, and that these two adjacent walls be in tight contact relative to each other without leaving any interval therebetween. It should be noted, however, that in case all of the adjacent receptacles are retained, throughout all the sections on the endless conveyor means, in the state that each two adjacent receptacles are in tight contact with each other, then this state will hamper the smooth movement of receptacles in certain sections of the endless conveyor means. Hence, it is necessary that there be provided appropriate spacings between each two adjacent receptacles which are travelling in those sections of the conveyor means other than the section in which the receptacles receive the supply of the viscous liquid. This is so, especially in order that the receptacles may be able to smoothly pass the curved sections formed on the endless conveyor means in view of the problem (3) mentioned above. Thus, there arises the necessity for the provision of spacings between adjacent receptacles whenever they are travelling in those curved sections. Taking the aforesaid conditions into consideration, we have solved the problems (2) and (3) by locally altering the transferring speed of the conveyor means, for example, by arranging the conveyor means so as to comprise a plurality of independent power-driven sections, instead of arranging it to be operated at a uniform speed throughout all the sections. The authors have improved the arrangement of the conveyor means and the position of the viscous liquid dispensing means as will be described in further detail later. In this improved arrangement, the looped conveyor means comprises locally a plurality of roller conveyors. If desired, the entire endless conveyor means may be formed with roller conveyors which can be driven at different speeds locally. A viscous liquid dispensing means may be provided at an appropriate position above the straight path or paths of the endless conveyor means. The endless conveyor means is arranged so that, during the period in which the receptacles—that have until then been carried forwardly on the conveyor with a small interval left between each two adjacent receptacles—proceed in said straight path, the speed of travel of the preceding receptacle will be slowed down relative to the speed of travel of the following receptacle. This may be achieved by adjusting the peripheral speed of those conveyor rollers located within the straight section in such a way that the intervals between a train of receptacles will be reduced successively so that the respective adjacent receptacles will, at length, be able to pass at a given constant speed under the viscous liquid dispensing means in the state of being completely in tight contact with each other. An arrangement is provided so that, after these receptacles have received continuously and successively the supply of the viscous liquid, the speed of travel of the preceding receptacle will be increased gradually relative to that of the following receptacle in the manner contrary to that described in connection with the arrival of the receptacles at the liquid dispensing means. For example, by adjusting the peripheral speed of certain conveyor rollers in said straight section to give some degree of spacing between the running adjacent receptacles, they will be able to pass smoothly the curved section because then there are maintained certain spacings between the adjacent receptacles in the looped sections of the conveyor means. Thereafter, the receptacles are caused to travel again toward the straight path.

Furthermore, it is an object of the present invention to prepare a uniform multi-layer structure by interposing a partition sheet material between two adjacent layers of viscous liquid in such a way that this sheet material is sandwiched between each two adjacent layers of viscous liquid which are formed by supplying a given amount of such a liquid into each of the receptacles. In addition to the solution of the previously mentioned problems, it is necessary to provide means for insuring the thicknesses of the respective formed layers of liquid to be equal and uniform. It will be understood that, in case the liquid used is of a relatively low viscosity, the liquid supplied into the receptacle will relatively quickly spread throughout the entire surface of the supporting area within the receptacle to produce a layer having a uniform thickness. In case, however, the liquid has a relatively high viscosity, such a liquid will not be able to spread throughout the entire floor area within a desired limited length of time. It is for this reason that there arises the necessity for the provision of an arrangement to effect uniform supply of liquid throughout the entire inner breadth of the receptacle.

It should be understood that a slit nozzle which is used in general has the drawback that the breadth of the ribbon of the viscous liquid which is allowed to flow downwardly from such a nozzle will become narrower with respect to the breadth of the nozzle per se during the course of flow of said liquid. Also, the use of a nozzle block equipped with a mere perforated plate having no projecting outlets will give rise to the inconvenience that the streams of liquid flowing downwardly from the adjacent nozzles will creep along the surface areas of the perforated plate adjacent to the edges of perforations owing to reasons such as the speed at which the liquid is allowed to flow downwardly, or the viscosity of the liquid or the surface tension of the liquid, and, possibly for any other reasons, the streams of liquid will tend to be brought into contact with each other too early during the course of their flow, with the result that a joined stream of liquid having an undesirable, insufficiently decreased breadth of ribbon of liquid will be formed. This tendency will be all the more intensified in proportion to an increase in the viscosity of the liquid used, and also in case the liquid undesirably contains bubbles. We have devised a nozzle block which is suitable also for a bubble-containing viscous liquid, enabling the latter to flow downwardly in the form of rows of streams of a sufficiently large breadth, and which is free from the development of alteration in the breadth of the rows of liquid streams during their downward flow.

More specifically, there is provided a nozzle block comprising: a rectangular plate having a plurality of liquid dispensing nozzles formed therethrough and projecting therefrom and arranged in rows and in staggered relation with respect to the nozzles in other rows; and an open-bottomed, end-closed tunnel-shaped liquid reservoir having a substantially U-shaped uniform cross section throughout the longitudinal length thereof and having two closed opposite ends, said reservoir being provided on the reverse side of the plate in such a fashion that said open bottom abuts the reverse side of the said plate and that the bottom free end edges of the reservoir are fastened in water tight relation to the solid peripheral end portions of the plate, there being provided at least one gas outlet at an appropriate portion of the top of the reservoir for letting out the gas contained in the liquid probably as bubbles, there further being provided at least one feed liquid inlet at an appropriate site or sites of the reservoir for introducing fresh liquid thereinto.

The present invention contemplates the provision of a method and an apparatus for preparing a uniform multi-laminar structure consisting of layers of a viscous liquid and natural or man-made sheet materials. This method can be put into practice by the use of an apparatus which is of the following construction and is operated in the following manner. A plurality of independent open top, flat-bottomed rectangular receptacles each having two opposite side walls and two opposite end walls extending from the four sides of the bottom wall of the receptacle to form a container of the type described are adapted to be carried and transferred in horizontal directions and in closely adjacent relation to each other on an endless conveyor means having at least one straight path and at least one curved path. During the course of travel of a train of receptacles of the type described in said straight path of the conveyor means, the speed of travel of the receptacles is decreased relative to the speed of travel of the following receptacles. By so arranging, said train of receptacles are brought into contact with each other successively. During the course of their travel, they are rendered constant in speed within the straight path of the conveyor means. On the other hand, a viscous liquid dispensing means is provided at an appropriate position above that portion of said straight path of the conveyor means where the travel speed of the receptacles is constant, and this dispensing means is adapted to cause the viscous liquid to flow downwardly in transverse rows of streams from the projecting nozzles at a predetermined constant rate in such a manner that said transverse rows of streams extend uniformly up to the entire transverse inner breadth of the open top of each receptacle. Thus, as the receptacles pass under this dispensing means, a viscous liquid dispensed in rows of a predetermined effective breadth is supplied onto each receptacle. Upon the completion of the supply of liquid to a first one of the train of receptacles, the speed at which this first receptacle is carried forward is increased relative to the following receptacle. By so doing, each two adjacent receptacles are retained at a certain interval relative to each other to such an extent as will not hamper the subsequent smooth passage of the receptacle in the looped portion of the path on the conveyor means. Furthermore, a natural or man-made sheet material is deposited on the entire surface of the layer of viscous liquid when the receptacle carrying the layer of viscous liquid arrives at an appropriate place of the path on the conveyor and at such a time when the thickness of the layer of the viscous liquid contained in the receptacle has become uniform owing to its own gravity. The method of the present invention consists of the repetition of the foregoing sequential series of steps at appropriate times.

According to the present invention, there are transferred a plurality of receptacles in horizontal directions and in closely adjacent relation with each other on an endless conveyor means having at least one straight section and at least one curved section of paths. As stated previously, the receptacles are brought into contact with each other in succession during the period in which these receptacles proceed through the straight path of the conveyor means. As they are carried forth at a constant speed in the aforesaid state, the supply of the viscous liquid onto the receptacles is completed one receptacle after another. Thereafter, the receptacles each carrying the layer of viscous liquid are caused to be separated from each other and are maintained at an interval therebetween which will be necessary for the subsequent smooth passage through the looped section of the conveyor means.

Each receptacle is a casing which is closed at the bottom but open at top and has two side walls and two end walls extending upwardly from the four sides of the bottom wall, thus defining the interior space of the casing. These receptacles all have a uniform transverse breadth which is perpendicular to the direction of travel. However, their longitudinal lengths extending in the direction of travel may not necessarily be identical. It should be understood, however, that the receptacles will need to have the same configuration and size in case it is intended to perform simultaneous mass production, on a large scale, of products which are uniform in size. The two side walls and two end walls may be provided in the form of substantially upright walls. As has been stated previously, the end wall located on the forward side facing the direction of travel preferably is inclined outwardly as it extends from bottom to top.

As for the method of supplying a viscous liquid to the receptacles, it is desirable to effect this supply by the use of a viscous liquid dispensing means which is fixed above the path of the conveyor means and to continuously dispense the liquid vertically at a constant rate. The looped conveyor means usually has two straight paths which are disposed in parallel spaced relations to each other. Where there are two straight paths, it is desirable to provide one viscous liquid dispensing means above each of these straight paths. It is also desirable to adjust the positions of the rectangular receptacles by the use of a position regulating means to insure that the receptacles are carried forth in correct positions on the track when they proceed at a constant speed on the straight paths where they are supplied with the viscous liquid. The provision of this position regulating means is intended for the prevention of possible run-off of the receptacles from the proper paths on the conveyor means, and also for the alignment of the centers of the breaths of the respective receptacles being carried forth with the center of the effective breath of the rows of streams of the viscous liquid which is dispensed continuously from the aforesaid dispensing means at a constant rate. Thus, this position regulating means serves as a guide for the receptacles. It should be understood that the receptacles may be maintained at a constant speed of travel at the same time that their positions are being controlled.

It is to be noted that the layer of the viscous liquid immediately after the liquid has been supplied onto the receptacle is not even and is not uniform in its thickness throughout the layer, regardless of whether the dispensing of the liquid is effected through a plurality of projecting nozzles formed in the nozzle block plate or it is performed through slit-like nozzles. It is only after the lapse of a certain length of time that a substantially flat liquid surface is formed owing to the inherent physical property of the liquid tending to sustain a free surface.

According to the present invention, a sheet of either natural or man-made material is deposited on the entire surface of the layer of the viscous liquid at an appropriate place above the conveyor means at such a time when it is ascertained that this flat surface of the layer of liquid has been formed. Thereafter, fine vibrations may be imparted to the receptacle, as required, to such an extent that this sheet material will not sink into the layer of liquid but that the sheet will be brought into uniform contact with the entire surface of the liquid to thereby obtain both the desirable close contact of the sheet with the surface of the layer of liquid and the homogeneity of the entire thickness of the layer of the liquid. This deposition of the sheet material and the imparting of vibrations may be performed either on the straight path or curved path of the conveyor means, depending on the viscosity of the liquid. The step of imparting vibrations may be performed by arranging so that at least one portion of the conveyor means located close to the place at which the sheet material is to be deposited is comprised of a plurality of power driven roller members.

While the present invention is applied to the preparation of a uniform multi-laminar structure which consists of layers of a viscous liquid and natural or man-made sheet materials, it is to be noted that the present invention is applicable to such viscous liquids having a viscosity ranging from about 50 to 1000 cps. For example, the starch-polyvinyl alcohol mixed reaction liquids which are used in the preparation of sheet-form articles consisting of a porous polyvinyl acetal material usually has a viscosity of the order of several hundred cps. measured at 50° C.

The present invention is especially useful in conducting mass production of sheet- or plate-form articles consisting of porous polyvinyl acetal materials, and also of those articles of the same materials wherein a natural or man-made sheet material is sandwiched in each article. In such a case, the viscous liquid for use in the process is produced in the manner as follows. A polyvinyl alcohol is dissolved in water and then the resultant solution is cooled to an appropriate temperature. Thereafter, an amount of water containing starch suspended therein is added to said solution, and the temperature of this starch-containing mixed solution is adjusted as required while stirring. Then, this mixed solution is subjected to heating to allow the starch to gelatinize, and thus, there is obtained a starch-polyvinyl alcohol mixed solution. The latter is of a viscosity of the order of 300-700 cps. measured at 50° C. This solution is then cooled to a required temperature. Then, an amount of an aldehyde such as formalin and a mineral acid such as sulfuric acid which serves as a catalyst is added to the resultant solution, and thus, a starch-polyvinyl alcohol reaction liquid is obtained. This liquid is of a viscosity ranging from about 500 to about 700 cps. at 50° C. This represents the viscous liquid which is referred to in the present invention. In this case the aldehydes used in the acetalizing reaction are mono- or di-aldehydes of paraffinic or aromatic hydrocarbon; however, formaldehyde or formalin is particularly suitable when considered from the economical viewpoint. In the acetalizing reaction mineral acid is used as a catalyst and such an acid is one selected from, for example, sulphuric acid, hydrochloric acid and phosphoric acid etc. As for foaming assistants, gelatinized starch or gelatinized derivatives of starch are usually used.

The present invention will hereunder be described in further detail with respect to a preferred embodiment by referring to the accompanying drawings.

Figure 2:
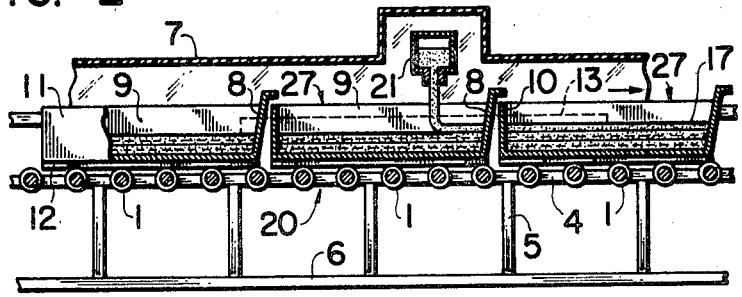
FIG. 2 is a somewhat diagrammatic side elevational view, partly in section, of the vicinity of a viscous liquid dispensing means of the apparatus shown in FIG. 1.

As shown in FIG. 1, an endless conveyor 20 is arranged to make a circulatory conveying movement starting from, for example, a straight path 23, proceeding to a curved path 25, and again to another straight path 24, and again to another curved path 26 and back to the first straight path 23. This conveyor 20 is provided also with a delivery path 28 which is arranged on one side thereof. In the example illustrated, the respective transfer mechanisms of this looped conveyor 20 are comprised of a plurality of power driven roller members 1, 1, 1, . . . Exactly above said straight paths 23 and 24 are provided nozzle blocks 21 and 22, respectively, of viscous liquid dispensing means. These nozzle blocks 21 and 22 are adapted to be supplied with a fresh viscous liquid at a constant rate through a device such as a feed pump not shown. A partitioning fibrous paper sheet supply station 2 is provided above the vicinity of the end portion of said curved path 25, and a reinforcement fabric sheet supply station 3 is provided above the vicinity of the end portion of said straight path 24. As shown in FIG. 2, the power driven roller members 1, 1, 1, . . . of the looped conveyor 20 are rotatably supported on appropriate frame members 4, 5 and 6. These roller members are adapted to be driven for rotation through their own sprocket wheels and chains from motors not shown. As will be discussed later, certain ones of the roller members are adapted to be rotated regularly at a desired peripheral speed. Though not shown in FIG. 1 but illustrated in FIG. 2, the looped conveyor 20 is covered with a transparent cover member 7 made of a synthetic resinous material in such a way that it will not hamper the travel of receptacles 27 nor the rotary movement of the roller members 1, 1 . . . This cover member 7 is provided to extend to substantially the entire regions of the looped conveyor 20. It should be noted, however, that there are provided apertures in those portions of the cover member 7 in the vicinity of the fibrous paper sheet supply station 2 and the fabric sheet supply station 3 to facilitate the supply of fibrous paper sheets and fabric sheets through said apertures of the cover member 7 onto the receptacles. Each of the nozzle blocks 21 and 22 of the viscous liquid dispensing means which are provided above the straight paths 23 and 24 transversely thereof, respectively, is equipped, at the bottom surface thereof, with a plate having rows of a plurality of projecting nozzles extending in the direction of the breadth of said plate in such a way that the rows of nozzles have effective lengths substantially equal to the uniform transverse inner breadths of the receptacles.

Figure 3:
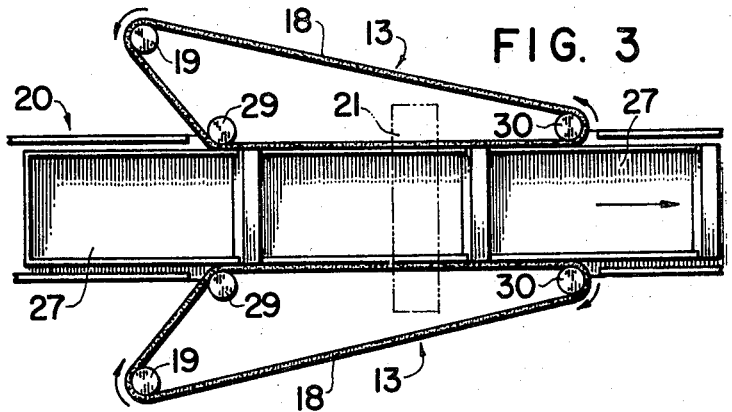
FIG. 3 is a somewhat diagrammatic enlarged plan view, illustrating a means for adjusting the relative positions, toward the travel path on the conveyor, of a plurality of rectangular receptacles shown in FIG. 1.
Figure 4:
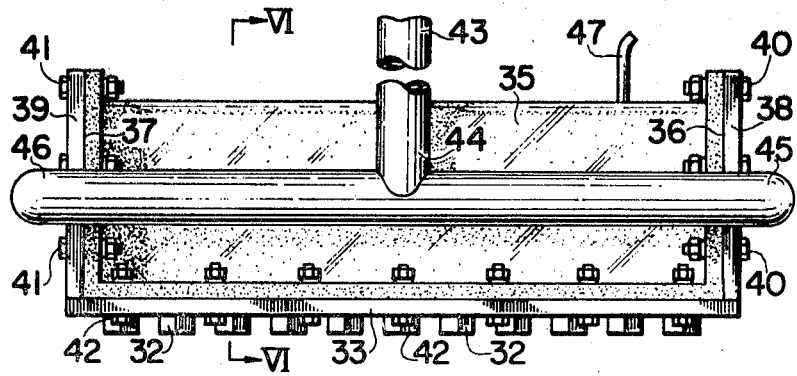
FIG. 4 is a somewhat diagrammatic enlarged frontal view of an example of the viscous liquid dispensing means for use in the apparatus of the present invention.
Figure 5:
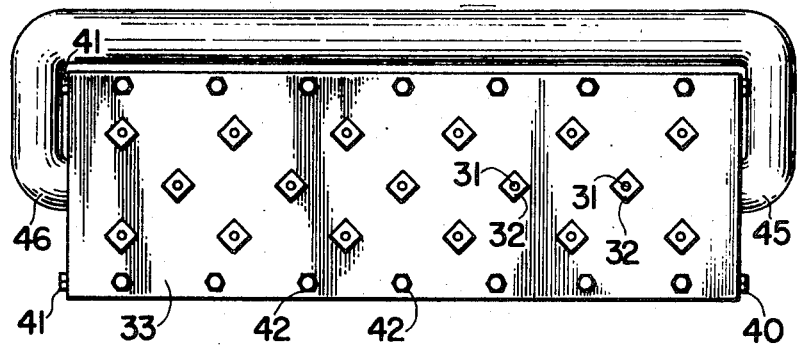
FIG. 5 is a somewhat diagrammatic bottom view of the viscous liquid dispensing means shown in FIG. 4.
Figure 6:
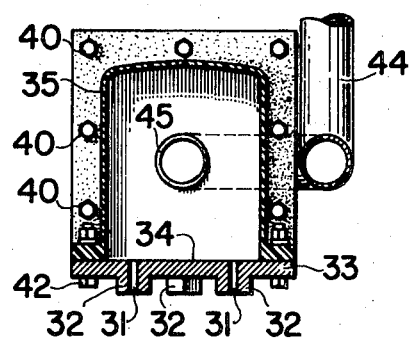
FIG. 6 is a somewhat diagrammatic vertical sectional view taken along the line VI—VI in FIG. 4.

As shown in FIG. 2, the receptacle 27 has one forward end wall 8 which is inclined outwardly starting from its bottom, and has a rear end wall 10 and two side walls 9 and 11, all of these three walls extending substantially upright. The receptacle 27 as a whole presents the configuration of an open top, flat-bottomed casing. The bottom surface of the receptacle 27 is provided with several reinforcement ribs 12 which extend horizontally in the direction of the travel of the receptacle. As shown in FIG. 1, a pair of endless apron roller means each being indicated generally at 13 and another pair at 14 are provided on both sides of those portions of the paths of the conveyor 20 which are located below the nozzle blocks 21 and 22. These two pairs of endless apron rollers means 13, 13 and 14, 14 each comprises endless belts 18, 18, power driven rollers 19, 19 for driving said endless belts 18, 18, guide rollers 29, 29 and guide rollers 30, 30. As will be noted from FIG. 3, each of the pairs of endless apron roller means has a portion wherein the endless belt travels straight along the corresponding side of the straight path of the looped conveyor 20. It is this straight portion of the endless belt that it is brought into contact with the external surface of one side wall of the receptacle 27 throughout its length, and the length of said straight portion of the belt is about 1.5 to 2.0 times the length of the side wall 9 or 11 of the receptacle. Each pair of these endless apron roller means 13, 13 and 14, 14 is arranged, therefore, as if it nips the external surfaces of the side walls 9, 11 of the receptacle 27 on both sides of the straight path of the looped conveyor 20 as said receptacle 27 passes through this pair of apron roller means. As will be understood clearly, the two apron roller means 13, 13 or 14, 14 which constitute a pair is provided in spaced, opposing relation with respect to each other at an interval which corresponds substantially to the external breadth of the receptacle 27 extending between the two side walls 9 and 11 as it passes through said pair of apron roller means. As stated above, each pair of endless apron roller means 13, 13 or 14, 14 will nip the receptacle 27 at both sides thereof while being in contact with the external surfaces of these side walls 9, 11, not only to thereby center the position of the travelling receptacle 27 but also to temporarily adjust the speed of travel of this receptacle 27, resulting in a closer contact between the preceding receptacle and the following receptacle and further in providing better accuracy in the speed at which the receptacles 27, 27 pass through the straight paths 23 and 24 of the looped conveyor 20. The aforesaid adjustment of the travel speed of the receptacle 27 may be attained by driving the endless apron roller means in such a way that they have a surface speed smaller than the peripheral speed of those roller members of the looped conveyor means located in the straight paths which are sandwiched by the endless apron roller means.

Description will hereunder be made on the structure of the nozzle block for dispensing a viscous liquid, by referring to the drawings.

A nozzle plate 33 is made of a stainless steel plate. This nozzle plate 33 is provided with a plurality of orifices 31, 31, 31 . . . which are same in diameter and which are formed through this plate 33 in rows such that those orifices in one row are positioned in staggering relation with respect to the positions of the orifices contained in the adjacent rows and in the same positional relations. The outlet of each of these orifices formed in the plate 33 is formed so as to have a projection 32 extending beyond the surface of said plate 33. A tunnel-shaped liquid reservoir 35 is made with a transparent synthetic resinous material and is of a generally U-shaped cross section extending uniformly throughout the longitudinal length thereof. The reservoir 35 has flanged peripheral end edges 36 and 37 and they are fixed in water tight relation to side plates 38 and 39, respectively, by a plurality of sets 40, 40 . . . and 41, 41 . . . of bolts and nuts. Thus, said end edges 36 and 37 of the reservoir 35 is tightly closed by these side plates 38 and 39. As a result, the said reservoir 35 presents a configuration of a sort of closed casing. This tunnel-like liquid reservoir 35 is placed on the reverse side 34 of the nozzle plate 33, i.e. on the side of the plate 33 opposite to the side from which the nozzles project. Said reservoir 35 is thus fastened to said reverse side 34 of the plate 33 by means of a plurality of sets 42, 42 . . . of bolts and nuts. A pipe 44 which is connected to a liquid inlet 43 communicates with one end of each of two pipes 45 and 46 which are same in internal diameter. The other end portions of these two pipes 45 and 46 are passed through these side plates 38 and 39, respectively, to communicate with the interior of said reservoir 35. Accordingly, these two pipes 45 and 46 serve as liquid supply pipes and constitute the passageways for introducing the liquid from the liquid inlet 43 into the tunnel-shaped liquid reservoir 35. Said tunnel-shaped liquid reservoir 35 is provided with at least one gas outlet 47 at the top portion thereof for removing the gas which may be contained in the liquid.

By the use of a nozzle block thus arranged, it is possible to take in the liquid from the liquid inlet 43 and to feed the same into the pipe 44 and therefrom to pass the liquid through the bifurcate pipes 45 and 46 and to feed the same into the tunnel-like liquid reservoir 35 and to cause the liquid to continuously flow downwardly through the orifices 31, 31 . . . of the projecting nozzles 32.

Since the nozzle block which is of the foregoing arrangement is provided with a nozzled rectangular plate 33 having a plurality of rows of identical nozzles positioned in predetermined staggered relations with each other, it will be understood that desirable uniform downflows of the viscous liquid are obtained to quickly form an even layer of liquid on the supporting surface. Especially, since the nozzle plate 33 is provided with projecting nozzles 32, 32 . . . there will occur no such undesirable phenomenon that the viscous liquid flowing out from the adjacent nozzles creeps along the bottom faces of the plate 33 to join together thereat, nor will there occur the phenomenon that the streams of viscous liquid join each other too early during the course of their down-flow from the nozzles—both of which are the inconveniences that have been encountered in the prior art. Being free of such undesirable modes of flow from nozzles, the streams of the viscous liquid according to the present invention will result in a uniform, smooth and flat faced layer formed within a very limited length of time upon arrival of the liquid streams onto the supporting floor or the like in the receptacle 27, and there is no fear for the development of uneven thicknesses in the resultant layer of liquid. Also, since the tunnel-like liquid reservoir 35 is of a generally U-shaped uniform cross section the entire longitudinal length thereof, the viscous liquid will make a smooth constant flow without causing stagnation therein. Besides, the liquid will flow out of the reservoir 35 without any unevenness in its speed and force. Along with this, the viscous liquid which has been introduced into the pipe 44 from the liquid inlet 43 will be divided equally into the two pipes 45 and 46 of the same size, so that this will also contribute to the formation of even streams of liquid flowing out of the reservoir 35. In addition, the provision of a gas outlet 47 on top of the tunnel-shaped reservoir 35 will allow the gas contained in the liquid to escape from the gas outlet 47 so that the gas contained in the liquid may thereby be removed.

Such a nozzle block not only is simple in structure but also is capable of causing even a bubble-containing reaction liquid to flow downwardly in uniform streams without joining together too early before reaching the floor, because the liquid discharged through the nozzles no longer contains gas to any undesirable amount. Thus, the nozzle block according to the present invention is of a very great advantage.

Description will hereunder be directed to the preparation of a uniform multi-laminar structure which is a pre-final product for manufacturing chamois leather-like sheets consisting of a porous polyvinyl acetal material. First, the power driven roller members 1, 1, . . . of the looped conveyor 20 are rotated. The direction of rotation of these roller members is such that the receptacles 27 placed thereon will be transferred counterclockwise on the horizontal surface of the looped conveyor 20 in FIG. 1, and that the receptacles 27 will be carried toward the right side in FIG. 2. Receptacles 27 are placed one after another on the roller members 1, 1, . . . at an appropriate site of the conveyor so as to assume proper position thereon, until they are disposed at appropriate intervals throughout the entire regions on the looped conveyor 20 as shown in FIG. 1. The driving roller members 1, 1, . . . may have peripheral speeds which are not uniform throughout the entire roller members of the looped conveyor 20. The driving roller members are divided into several groups, and the roller members in each group are driven via their sprocket wheels and chains so as to be rotated at a desired speed which may be different from the speed of other groups. More specifically, the roller members of the group contained in that portion of the first straight path 23 up to the point at which the receptacle 27 is about to reach the first nozzle block 21, and the roller members of another group contained in that portion of the second straight path 24 up to the point at which the receptacle 27 is about to reach the second nozzle block 22, are rotated at gradually reduced speeds relative to each other as their positions go toward the direction of travel of the receptacle. As a result, during the course of travel of a series of receptacles on each of these straight paths, they will be gradually brought into contact with the preceding receptacles successively one after another to form a continuous train of contacting receptacles. Contrariwise, the roller members located in the region of the paths at which the receptacle 27 exits the site located under the first nozzle block 21 till it enters the first curved path 25, and also the roller members located in another region of the paths at which the receptacle 27 exits the site located under the second nozzle block 22 till it enters the second curved path 26, are rotated at gradually increased speeds in said orders, in order to give appropriate intervals between the preceding receptacles and the following receptacles.

On the other hand, a viscous liquid which is a mixed liquid prepared by adding sulfuric acid, Formalin and a foaming assistant to an aqueous solution of a polyvinyl alcohol is introduced into the nozzle blocks 21 and 22 so that a desired amount of the liquid may be caused to flow downwardly continuously from the nozzles of these blocks 21 and 22. The starting of the operation may be effected in several ways. However, description will be made hereunder on the instance wherein the operation has been started in an appropriate and desirable manner into continuous operation, while paying particular attention to one receptacle.

Figure 7:
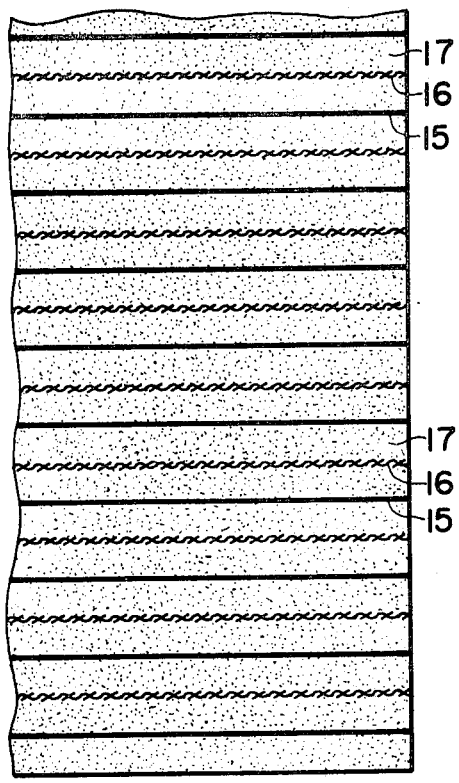
FIG. 7 is a somewhat diagrammatic enlarged vertical sectional view of a part of a uniform multi-layer structure prepared according to the method of the present invention.

The receptatcle 27 will receive the supply, at a predetermined rate, of the viscous liquid from the first nozzle block 21 as it passes under this nozzle block 21. The receptacle 27 will proceed therefrom and, after passing the first curved path 25, it will pass the vicinity of the site where there is a paper sheet supply station 2. During the passage of the receptacle in said vicinity, it receives the supply of a fibrous paper sheet either automatically or manually, through the aperture formed in the cover member 7. Thereafter, when the receptacle 27 passes under the second nozzle block 22, it receives the supply of the viscous liquid at a predetermined rate from this second nozzle block 22. Subsequently, when the receptacle 27 passes in the vicinity of the fabric sheet supply station 3, it receives the supply of a sheet of fabric either automatically or manually through the aperture formed in the cover member 7. The foregoing steps are repeated several times. As stated previously, when the receptacle 27 passes right under the first nozzle block 21, this receptacle 27 is in close contact with both the preceding receptacle and the following receptacle. There, the receptacle 27 is caused to be properly regulated of its position by the belts 18, 18 of the apron rollers 13 and 13 so as to be centered with respect to the liquid dispensing means provided thereabove. Not only that, but also the receptacle 27 is regulated of its travelling speed by the belts of these apron rollers 13 and 13. As a result, the longitudinal positional relationship between the adjacent receptacles will become even closer, and also the receptacle will be able to proceed at a very accurate constant speed. Accordingly, the layer of the liquid contained in the receptacle will become sufficiently homogeneous in thickness. After the lapse of a predetermined time, the receptacle 27 will arrive right under the paper sheet supply station 2 at which a sheet of fibrous paper will be deposited on the surface of the layer of the liquid at such a time when the thickness of the liquid layer has become rendered to a desirable condition in which it has become uniform throughout the layer owing to its own gravity. During the course of travel from the fibrous paper supply station 2 up to the next nozzle block 22, the receptacle 27 is imparted fine vibrations from the actuated driving roller members 1, 1, . . . of the looped conveyor 20, to such an extent that the fibrous paper sheet will be brought into better contact with the entire surface of the layer of liquid without sinking into the layer. The action of this second nozzle block 22 is identical with that of the first nozzle block 21. Also, the behaviors of the receptacle 27 and the roller members 1, 1, . . . located in the region departing from the second nozzle block 22 up to the fabric sheet supply station 3 are identical with those described in connection with the course from the first nozzle block 21 up to the paper sheet supply station 2. The behaviors of the receptacle 27 and the roller members located in the region departing from the fabric sheet supply station 3 up to the first nozzle block 21 are identical with those described in connection with the course from the paper sheet supply station 2 up to the second nozzle block 22. After several repetitions of the aforesaid sequential series of steps, the receptacle 27 is withdrawn outside the system from the delivery path 28. The resultant multi-laminer structure of the viscous liquid obtained from the receptacle 27 delivered from the path 28 is provided in the form of a uniform multi-laminar structure of layers 17 of viscous liquid containing sheets of fibrous paper 15 and sheets of fabric 16 in alternate fashion as shown on an enlarged scale in FIG. 7.

In the foregoing instance, the laminar structure thus obtained is allowed to react in an air bath at 40° C. for about 40 hours. After the completion of this acetalizing reaction, the gelatinized contents are washed thoroughly with water. Whereupon, the fibrous paper sheets are softened and washed away, and thus, chamois leather-like porous sheets each containing a reinforcement fabric sheet therein are obtained.

As stated above, according to the present invention, there is used a receptacle having one of the end walls inclined outwardly as it extends from bottom to top. Such a receptacle is placed on the horizontal surface of a looped conveyor means so as to assume a proper position in such a way as to have inclined end wall facing the direction of travel of the receptacle. Accordingly, in case a viscous liquid is supplied from a liquid dispensing means into said receptacle, there will be formed no "dead angle" or "shade" between the streams of liquid and the forward end portion of the floor area adjacent to the inner face of the forward end wall of the receptacle, and thus, there is obtained a uniform layer of liquid throughout the supporting surface in the receptacle. In addition, the viscous liquid is supplied by allowing it to flow downwardly at a constant rate from the viscous liquid dispensing means for the entire transverse inner breadth of the receptacle relative to the direction of the travel of the receptacle. Furthermore, the receptacle is adapted to proceed at a constant speed on the straight path of the looped conveyor means so as to insure the passage of said receptacle through the site at which the viscous liquid is dispensed from thereabove. This and the outward inclination of the forward end wall of the receptacle will coordinate together in rendering the layer of the viscous liquid to the condition of having a more uniform thickness throughout the entire portions thereof within the receptacle. Still further, the viscous liquid is dispensed from above the receptacles in such a state of the latter that the preceding receptacles are tightly in contact with the following receptacles as they are carried forth on the straight path where they receive the supply of the viscous liquid at a predetermined rate, and also that the receptacles are regulated of their positions on said straight path so as not to deviate sideways from the center of the path on which they are transferred forwardly. As a result, the streams of the viscous liquid will never be spilt outside the borders of the receptacles, and thus, not only wasteful loss of the feed liquid is avoided but also is there no fear that portions of the equipment such as the mechanical parts are soiled. Another feature of the invention is that the receptacles are not carried forth at a uniform speed throughout the entire paths of the looped conveyor means, but instead, the receptacle which has passed the site right under the viscous liquid dispensing means is adapted to be carried forth at a gradually increasing speed relative to the speed at which the following receptacle is transferred forwardly before it completely passes the site right under the dispensing means. As a result, there is provided and maintained an interval between each two adjacent receptacles in the train of receptacles to such an extent as will not hamper their subsequent smooth passage in the curved sections of the looped conveyor means. Thus, it is possible to effect a very smooth continuous operation and this provides for a highly efficient operation. Also, after a sheet of fibrous paper or fabric has been deposited on the surface of the layer of liquid, there is imparted to the receptacle fine commotions or fine vibrations to such an extent as will cause the sheet of fibrous paper or fabric to uniformly contact the entire surface of the layer of liquid within a relatively small length of time without sinking into the layer of liquid. This not only will reduce the length of time required for the paper sheet or fabric sheet to completely attach to the entire surface of the layer of liquid, but also will insure an unfailing close contact of the sheet onto the entire surface of the layer of liquid.

As stated above, the present invention permits one to perform, in an extremely reasonable manner, the preparation of a uniform multi-laminar structure consisting of layers of a viscous liquid and sheets of natural or man-made materials, and also to perform at least the principal steps of operation automatically. Thus, the present invention is of marvelously great advantage and usefulness.

It should be understood that the present invention is not limited to the example or embodiment described above, but that it provides a method and an apparatus which can be applied to the manufacture of multi-laminar finished articles such as sponge handkerchief, man-made leather, synthetic rubber, sheet-form packings and gaskets, mortar, asphalt, foodstuff such as jelly and agar-agar, or the like articles of various other kinds. It should be understood by those skilled in the art that many modifications of the steps and alterations of the design of the apparatus may be made arbitrarily as required without departing from the spirit of the present invention.

We claim:

1. An apparatus for continuously preparing a uniform multilayer structure consisting of layers of viscous liquid and sheet material, comprising:
   a plurality of generally rectangular, open-top, flat-bottomed receptacles having a continuous, upright, peripheral wall defined by two opposed side walls and two opposed end walls;
   an endless conveyor having power-driven conveying means defining a horizontal conveyor surface, said conveyor having at least one straight section and at least one curved section, said recpetacles being disposed on said conveying means for movement thereby horizontally through a closed path;
   means for disposing said receptacles in tight, abutting, end-to-end contact with each other as they move through a zone along said straight section of said conveyor and for moving the abutting receptacles at a predetermined constant speed in said zone;
   means for spacing said receptacles from each other as they move along said curved section of said conveyor;
   a viscous-liquid dispensing means disposed above said zone of the straight section of said conveyor, said dispensing means extending crosswise of the conveyor and having liquid discharge orifice means extending across substantially the entire width of said receptacles between said side walls thereof, said dispensing means being capable of dispensing viscous liquid continuously at a predetermined rate into receptacles as they pass beneath said dispensing means in end-to-end contact with each other at said predetermined constant speed;
   at least one station disposed above said conveyor at a location spaced from said dispensing means for supplying sheet material to said receptacles; and
   means for feeding fresh viscous liquid to said dispensing means at a predetermined constant rate.

2. An apparatus according to claim 1, in which said conveying means comprises a plurality of independently driven sections provided in sequential serial fashion, of which the independent driving section located below said dispensing means is operated at a forward speed smaller than that of the independent driving sections located before and back of said first-named independent driving section to thereby insure that the receptacles proceed forwardly while being brought successively into tight contact with each other in the zone on the conveyor surface directly under said dispensing means.

3. An apparatus according to claim 1, in which the forward end wall of each of said receptacles located on the leading side and facing the direction of travel of the receptacles is inclined upwardly and outwardly, with the other three side and end walls being substantially vertical, said receptacles being substantially identical in dimensions.

4. An apparatus according to claim 1, in which at least a part of said conveying means is comprised of power-driven roller members.

5. An apparatus according to claim 1, in which at least a part of the conveying means located close to the sheet material supplying station is comprised of power-driven roller members.

6. An apparatus according to claim 1, in which said conveyor has two parallel straight sections connected at their ends by two curved sections.

7. An apparatus according to claim 6, in which a pair of said viscous liquid dispensing means is provided, one dispensing means being disposed above each straight section of the conveyor.

8. An apparatus according to claim 1, in which there is provided, in said zone of said straight section, at least one means for regulating the position and the speed of the receptacles relative to the conveyor.

9. An apparatus according to claim 8, in which said position and speed regulating means comprises a pair of endless driven belts facing each other and located above said conveying means and on opposite sides of said zone of the straight section for frictionally contacting the outer surfaces of the sidewalls of the receptacles.

10. An apparatus according to claim 1, in which said viscous-liquid dispensing means has a nozzle block comprising a rectangular plate provided with a plurality of liquid dispensing nozzles of the same size formed therethrough and projecting therefrom and arranged in rows with the rows being in staggered relation, and a tunnel-shaped viscous-liquid reservoir comprising an open bottom vessel having a substantially U-shaped uniform cross section along the longitudinal length thereof, said reservoir being closed at its opposite ends and being tightly fastened to said plate on the side thereof opposite to the side from which said nozzles project, said reservoir being provided with at least one gas outlet at the top thereof and also with at least one viscous liquid feeding inlet.

11. An apparatus according to claim 1, in which said apparatus is provided with a cover member covering substantially the entire structure of said apparatus in such a way as will not hamper the operation of the apparatus, said cover member being provided with at least one aperture formed in the portion in the vicinity of the site at which said sheet materials are to be supplied to the receptacles to thereby enable this supply to be performed through said aperture.

References Cited
UNITED STATES PATENTS

| | | | |
|---|---|---|---|
| 2,342,920 | 2/1944 | Clark | 18—4 C |
| 3,124,916 | 3/1964 | Anderson et al. | 53—282 X |
| 3,328,225 | 6/1967 | Urbanic et al. | 156—78 X |
| 3,444,031 | 5/1969 | Schrenk | 156—500 X |

BENJAMIN A. BORCHELT, Primary Examiner

G. E. MONTONE, Assistant Examiner

U.S. Cl. X.R.

18—4 C; 53—282; 156—78

UNITED STATES PATENT OFFICE
CERTIFICATE OF CORRECTION

Patent No. 3 687 784     Dated August 29, 1972

Inventor(s) Yoshio Ohno, Korekiyo Eda, Toshio Yamamura and Kosaburo Yamasaki

It is certified that error appears in the above-identified patent and that said Letters Patent are hereby corrected as shown below:

The name of the inventor "Toshio Tamamura" is corrected to read ---Toshio Yamamura---.

Col. 1, line 12; "16 Claims" is corrected to read ---11 Claims---.

Signed and sealed this 24th day of April 1973.

(SEAL)
Attest:

EDWARD M. FLETCHER, JR.         ROBERT GOTTSCHALK
Attesting Officer               Commissioner of Patents